Aug. 20, 1957  J. N. COOPER  2,803,431
TREE PULLER
Filed Jan. 20, 1956  2 Sheets-Sheet 1

INVENTOR.
JOHN N. COOPER
BY
McMorrow, Berman + Davidson
ATTORNEYS

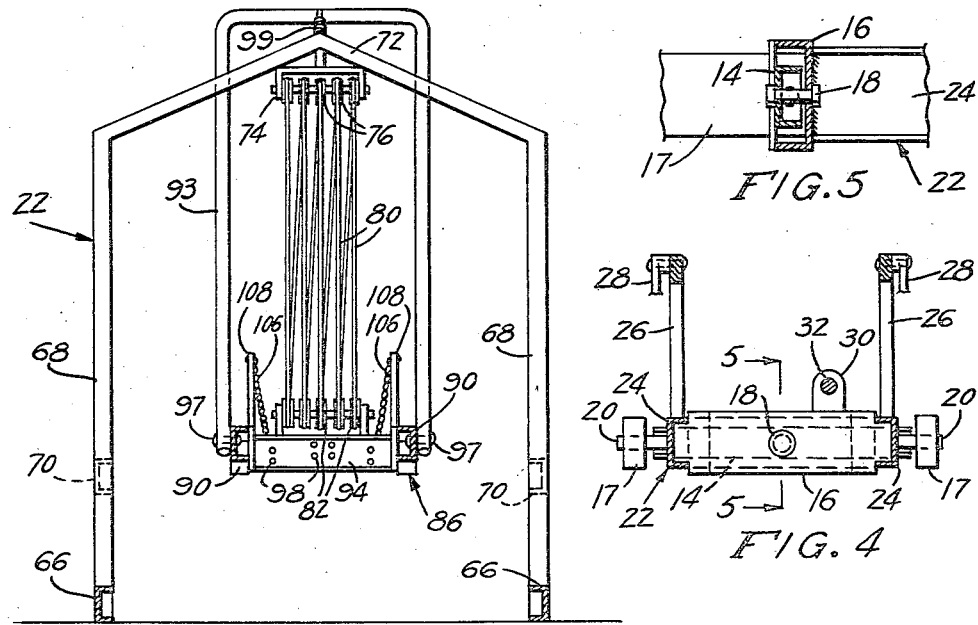
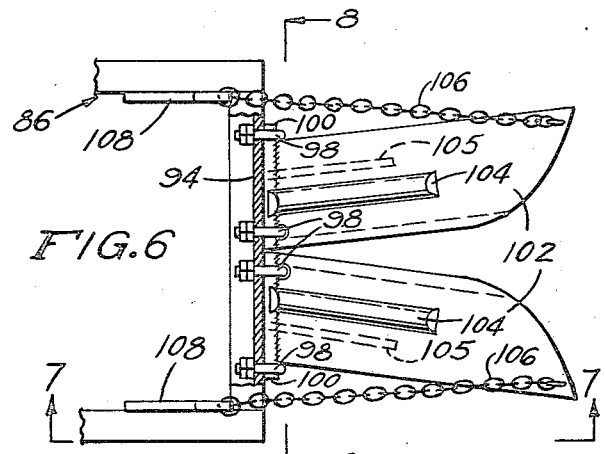
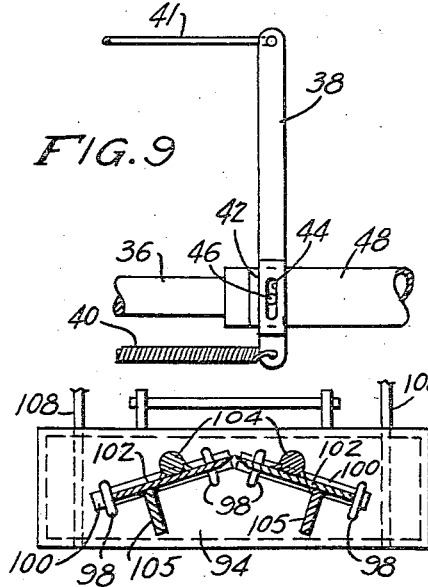
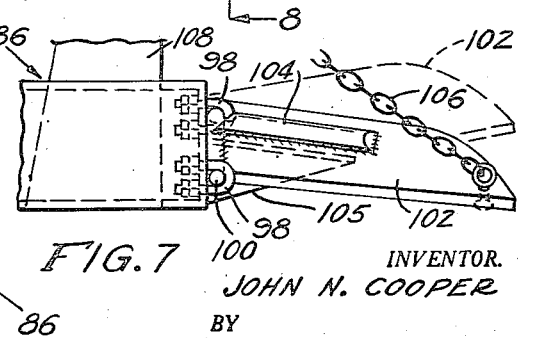

United States Patent Office 2,803,431
Patented Aug. 20, 1957

2,803,431
TREE PULLER
John N. Cooper, Mason, Tenn.
Application January 20, 1956, Serial No. 560,345
3 Claims. (Cl. 254—128)

This invention relates to apparatus for pulling trees, stumps, etc., and more particularly has reference to apparatus for this purpose attachable to a conventional tractor having a typical three-point hook-up or hitch.

The main object of the present invention is to provide apparatus as described which will be particularly efficient in uprooting trees or stumps of various sizes, while still being possessed of a marked simplicity of construction, thus to permit manufacture at relatively low cost and to assure, further, substantially trouble-free operation and low maintenance expenses.

Another object is to provide a device of the nature referred to which will be attachable to a conventional three-point hitch tractor without requiring modification or redesign of any portion of the tractor.

Still another object is to provide a mounting of the device upon the tractor which will permit power to be transmitted to a winch means comprising a component part of the device, while at the same time permitting lateral tilting of the device in either direction to accommodate the same to the contour of the ground on which it is being used.

Still another object is to provide in the device an improved tree-engaging means in the form of a pair of blades or plates so mounted as to swing both upwardly and downwardly and laterally, with said plates being particularly shaped to assure a firm grip upon the tree when the tree is to be uprooted.

Still another object of importance is to provide a device of the nature referred to having a novel formation and coactive relationship of a main, ground-engaging frame mounted for lateral tilting movement upon the tractor, and an auxiliary frame connected to the main frame for up-and-down swinging movement in each position to which the main frame is tilted.

Other objects will appear from the following description, the claims appended thereto, and from the annexed drawing, in which like reference characters designate like parts throughout the several views, and wherein:

Figure 3 is a transverse section on line 3—3 of Figure 1;

Figure 4 is a transverse section on line 4—4 of Figure 1;

Figure 5 is an enlarged, detail section on line 5—5 of Figure 4;

Figure 6 is an enlarged sectional view on line 6—6 of Figure 1, showing the tree-engaging means;

Figure 7 is a side elevational view of the tree-engaging means as seen from the line 7—7 of Figure 6;

Figure 8 is a transverse sectional view on line 8—8 of Figure 6; and

Figure 9 is an enlarged, fragmentary, side elevational view showing a portion of the drive mechanism and the associated support therefor.

Figures 1, 2:
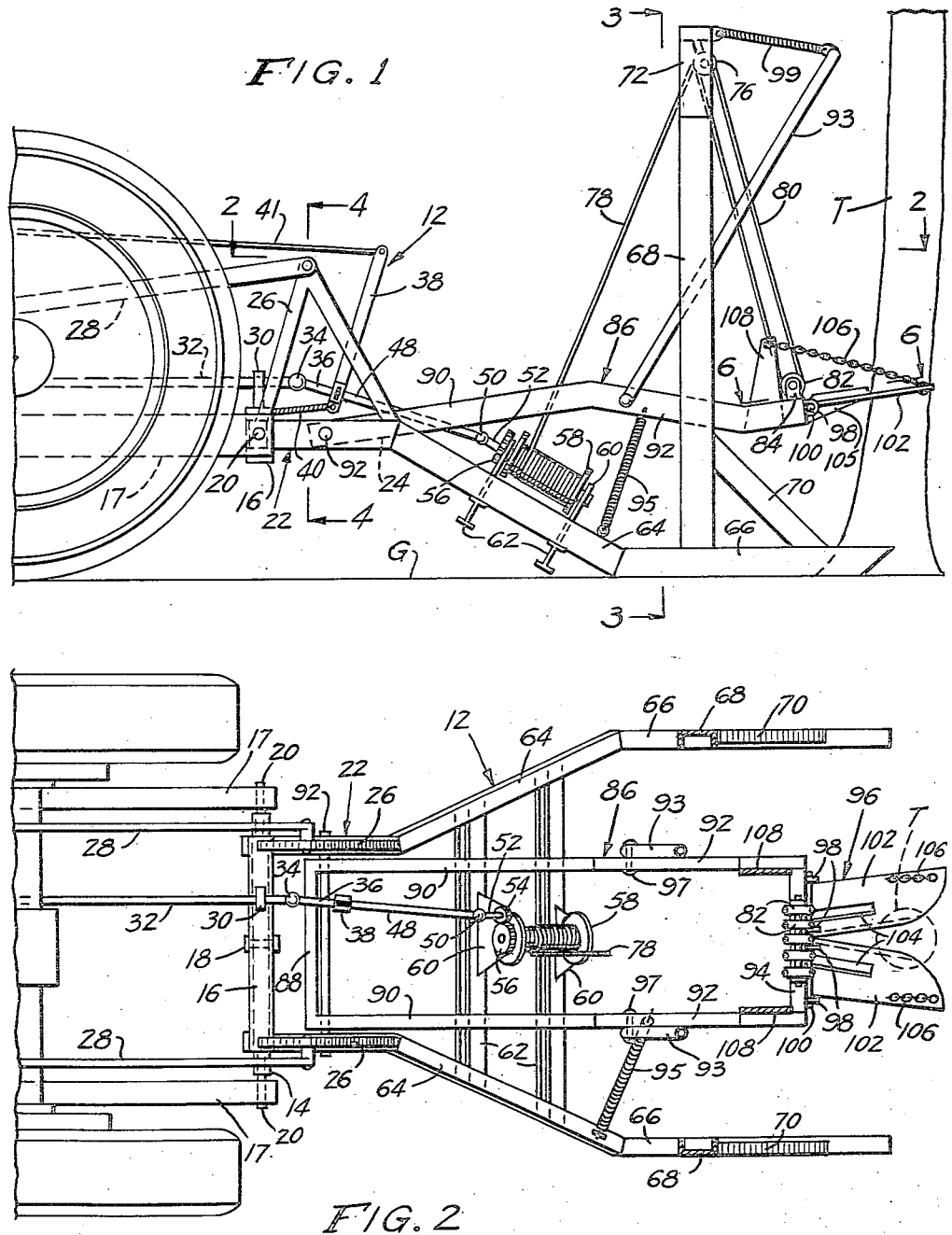
Figure 1 is a side elevational view of apparatus formed according to the present invention, as it appears when in use.
Figure 2 is a top plan view of the apparatus.

Designated generally by the reference numeral 10 is a conventional tractor of the type having a three-point hitch, while at 12 there has been similarly designated the device constituting the present invention.

The device includes a draw bar assembly shown to particular advantage in Figures 4 and 5. Said assembly includes a draw bar 14 of channeled formation extending within a channeled cross bar 16 extending between a pair of support bars 17 rigid with the rear end portion of the tractor.

The draw bar extends transversely of the device, and extending through the midlength portion of the draw bar is a pin 18 also extending through the cross bar 16, mounting the cross bar 16 for rockable movement upon the draw bar about the axis of the pin, that is, about an axis extending longitudinally and centrally of the device and of the tractor.

In this way, the cross bar 16 can rock about the axis in either direction for self-adjustment of the device to uneven ground contours.

Rigid with and projecting outwardly from the opposite ends of the draw bar are spindles 20, said spindles or pins passing through the support bars 17. The draw bar pivots on the spindles about an axis extending longitudinally of the draw bar, with the cross bar turning with the draw bar about the axis defined by the spindles.

A main frame 22 includes side rails 24, having welded connections at their tractor-adjacent ends to the cross bar 16, which is part of the main frame, thereby to mount the main frame for up-and-down swingable movement about an axis defined by the spindles, and for lateral tilting movement upon pin 18 to which the main frame is so swung.

Rigid with and projecting upwardly from the side rails 24 are frames 26 of inverted V-shape, to which are pivotally connected rods 28 adapted for pivotal connection at their other ends to the lift mechanism, not shown, of the tractor. On pulling of the rods to the left in Figures 1 and 2, the main frame will be elevated out of contact with the ground surface G, to permit transport of the device to a selected location.

Rigid with and projecting upwardly from one end of the cross bar 16 is an ear 30 apertured for extension of a shaft 32 therethrough. The shaft 32 is connectable at one end, not shown, to the power take-off of the tractor, and at its other end is connected by a universal joint 34 to an intermediate shaft 36.

A slip clutch lever 38 is connected at its lower end to a contractile spring 40 which is secured to the draw bar frame, the other end of the lever 38 being connected to a cable 41 extending to the operator's seat of the tractor.

Intermediate its ends, the slip clutch lever has a circular portion 42, slotted at diametrically opposite locations as at 44 to receive pins 46 projecting outwardly from opposite sides of a slip clutch disposed to selectively engage the shaft 36 with a shaft 48 in a driving relationship. It will be understood that any of various types of clutching mechanisms can be employed, it being mainly important that the shafts 36, 48 be brought into driving relationship, or disengage from a driving relationship, under the control of the operator.

It will further be understood that any one or more of the shafts can be a spline shaft, so as to permit extension or reduction of the length of the drive shaft means 32, 36, 48 as necessary during the up-and-down swinging movement of the main frame relative to the tractor.

Shaft 48 is connected by universal joint 50 to the shaft 52 (Figures 1 and 2), the shaft 52 being a short stub shaft having a small gear 54 in mesh with a larger gear 56 secured to the shaft of a winch drum 58. The winch drum shaft is journalled in bearing plates 60 fixedly secured to and projecting upwardly from cross braces 62 extending between divergent, downwardly inclined portions 64 of the side rails 24.

At their divergent ends, the portions 64 are connected to outer end portions 66 of the side rails, these extending in parallel relation and being adapted to rest upon the ground G during use of the apparatus.

Rigid with and projecting upwardly, from the respective rail portions 66 are the side members 68 of a large, upstanding sheave assembly support frame, said frame being braced in its upstanding position by inclined brace members 70 extending between the side members 68 and the rail portions 66.

At their upper ends, the side members 68 are connected to a header 72 formed in the shape of a shallow, inverted V, and depending from the midlength portion of header 72 is a pulley hanger 74, carrying a series of side-by-side pulleys or sheaves 76. A cable 78 extending from the winch drum is trained over one of said sheaves, and then is extended as at 80 about the remaining sheaves and about cooperating sheaves 82 carried by a support 84 mounted upon the outer end of an auxiliary frame 86.

It will be understood that a typical pulley installation is used, such that on rotation of the winch drum in a cable-winding direction, the length of the portions 80 of the cable extending between the sheaves 76, 82 will be progressively reduced to elevate the auxiliary frame 86. On rotation of the winch drum in an opposite direction, the auxiliary frame 86 is lowered to a selected elevation above the ground surface.

Auxiliary frame 86 is disposed between the side rails of the main frame, and at one end, has a cross bar 88 rigid with the inner ends of side portions 90 of the auxiliary frame. A pivot shaft 92 extends through the inner ends of the side portions 90, to mount the auxiliary frame upon the main frame for up-and-down swinging movement, about an axis paralleling the transverse axis upon which the main frame swings.

The side portions 90, as shown in Figure 1, are of zig-zag formation, with the outer end of the auxiliary frame being offset downwardly with respect to the inner end thereof. This results from the provision of inclined intermediate portions 92, merging into outer end portions of the side portions of the auxiliary frame. Fixedly connected between the outer end portions is a cross bar 94 on which the support for the lower sheaves 82 is mounted.

To prevent a tree T from striking the sheave assembly or its associated support frame, and to assure that the tree, after being pulled, will fall away from the apparatus a guard frame 93 of inverted U-shape is pivoted at 97 upon the auxiliary frame and is extended under header 72 in an inclined position, being supported by an expansion spring 99. When auxiliary frame 86 is swung upwardly relative to the main frame in pulling a tree, the legs of the guard frame will ultimately be engaged by the header 72. This will cause the guard frame to swing toward the tree about its pivot 97 to push the tree away from the apparatus and cause it to fall toward the right in Figure 1.

A tree-engaging means has been generally designated at 96, and has been shown to particular advantage in Figures 6, 7, and 8. Projecting outwardly from the cross bar 94 are transversely spaced U-clamps 98, arranged in pairs, the clamps of each pair being arranged (see Figure 8) to receive oppositely inclined pivot shafts 100.

Rigid with the shafts 100 are elongated plates 102 projecting rearwardly from the auxiliary frame and having sharpened, curved inner edges defining between them an approximately V-shaped recess adapted to receive the tree T.

Fixedly secured to the top surfaces of the respective plates are brace bars 104, and fixed to and depending from the plates are triangular stop plates 105. The bars 104 are so designed as to limit upward swinging movement of the plates 102 beyond a position shown in dotted lines in Figure 7. The plates 105 have inner end edges so disposed as to engage against the cross bar 94 whenever the plates 102 are swung downwardly to their full line positions of Figure 7.

Teeth can be provided in the tree-engaging edges of the plates, of course, to increase the grip thereof upon the tree.

It will be noted that since the plates 102 are swingable about oppositely inclined axes between the full and dotted line positions shown in Figure 7, the V-shaped recess will be enlarged or reduced, according to whether the plates swing upwardly or downwardly.

To brace the plates 102 when they are swung downwardly and are lifting the tree, chains 106 are provided, connected between plates 102 and upstanding ears 108 rigid with the sides of the auxiliary frame.

In use of the device, ordinarily the entire apparatus is elevated out of contact with the ground until the apparatus is at the desired location. Then, the apparatus is lowered until the outer end of the main frame is in engagement with the ground as shown in Figure 1 with the tree disposed between the side rails of the main frame. The tractor is then backed up, with the auxiliary frame first being lowered or raised to a selected elevation along the tree trunk.

When the plates 102 engage the tree trunk, they will be swung upwardly and spread thereby, and on further backward movement of the tractor they will bite into the tree trunk at opposite sides thereof.

With the tree now securely engaged, and with the main frame bearing against the ground G, the winch is operated to elevate the auxiliary frame, and the tree will now be uprooted and lifted bodily by the auxiliary frame. As the auxiliary frame begins to move upwardly, the plates 102 will swing downwardly. In this position of plates 102, the recess therebetween will be reduced and the plates will bite firmly into the tree.

This is due to the fact that with the plates in their spread, dotted line position and swung upwardly as shown in dotted lines in Figure 7, the tree resists the upward pull exerted thereon by the auxiliary frame during elevation of the auxiliary frame and the plates will accordingly be swung downwardly. Due to the inclined axes of the plates, the downward swinging movement thereof will be accompanied by a swinging of the plates laterally, toward one another to their Figure 6 position, causing the plates to bite deeply into the wood.

When the tree has been fully uprooted, the slip clutch is released and contractible springs 95 connected between the main and auxiliary frames will now be free to pull the auxiliary frame downwardly readying the apparatus for removal of another tree.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a tractor attachment, a tree puller comprising: a draw bar adapted for connection to a tractor; an elevatable main frame connected to said draw bar and including a pair of laterally spaced side rails adapted to extend in contact with the ground surface at opposite sides of a tree to be pulled; an auxiliary frame pivoted on the main frame to swing about an axis extending transversely of the main frame; means carried by the main frame for swinging the auxiliary frame to selected elevations above the ground surface; and a pair of plates pivotally connected at one end to the auxiliary frame for up-and-down swinging movement, in laterally spaced relation, for embracing said tree between them, whereby to elevate the tree for dislodging the same responsive to elevation of the auxiliary frame, said plate including means limiting swinging movement thereof in a downward direction beyond a position in which they are in the general plane of the auxiliary frame, and further including means limiting upward swinging movement thereof beyond a position in which they are disposed obliquely to said plane, said plates being individually swingable in a lateral direction toward and away from one another in each position to which they are swung upwardly and downwardly.

2. In a tractor attachment, a tree puller comprising: a draw bar adapted for connection to a tractor; an elevatable main frame connected to said draw bar and including a pair of laterally spaced side rails adapted to extend in contact with the ground surface at opposite sides of a tree to be pulled; an auxiliary frame pivoted on the main frame to swing about an axis extending transversely of the main frame; means carried by the main frame for swinging the auxiliary frame to selected elevations above the ground surface; and a pair of plates mounted on the auxiliary frame in laterally spaced relation for embracing said tree between them, whereby to lift the tree for dislodging the same responsive to elevation of the auxiliary frame, said plates having divergent, confronting edges so as to define between them a substantially V-shaped recess in which the tree is received, the plates swinging about oppositely inclined axes upon the auxiliary frame, for enlarging and reducing said recess responsive, respectively, to upward and downward swinging movement of the plates.

3. In a tractor attachment, a tree puller comprising: a draw bar adapted for connection to a tractor; an elevatable main frame connected to said draw bar and including a pair of laterally spaced side rails adapted to extend in contact with the ground surface at opposite sides of a tree to be pulled; an auxiliary frame pivoted on the main frame to swing about an axis extending transversely of the main frame; means carried by the main frame for swinging the auxiliary frame to selected elevations above the ground surface; a pair of plates mounted on the auxiliary frame in laterally spaced relation for embracing said tree between them, whereby to lift the tree for dislodging the same responsive to elevation of the auxiliary frame, said plates having divergent, confronting edges so as to define between them a substantially V-shaped recess in which the tree is received; abutment means extending upwardly from the main frame; and a guard frame pivoted on the auxiliary frame and slidably contacting said abutment means on elevation of the auxiliary frame to swing the guard frame about the axis of its pivotal connection, said guard frame when so swung about its axis swinging toward said plates above the same to exert pressure against the tree tending to move the same away from the main and auxiliary frames.

References Cited in the file of this patent
UNITED STATES PATENTS

| | | |
|---|---|---|
| 2,436,510 | Ferguson | Feb. 24, 1948 |
| 2,682,715 | Walby | July 6, 1954 |